Aug. 28, 1962
R. F. PFENNIG
SOLVENT EXTRACTION WITH LIQUID SULFUR DIOXIDE FOLLOWED BY HYDROCARBON WASH
Filed July 6, 1954
3,051,650
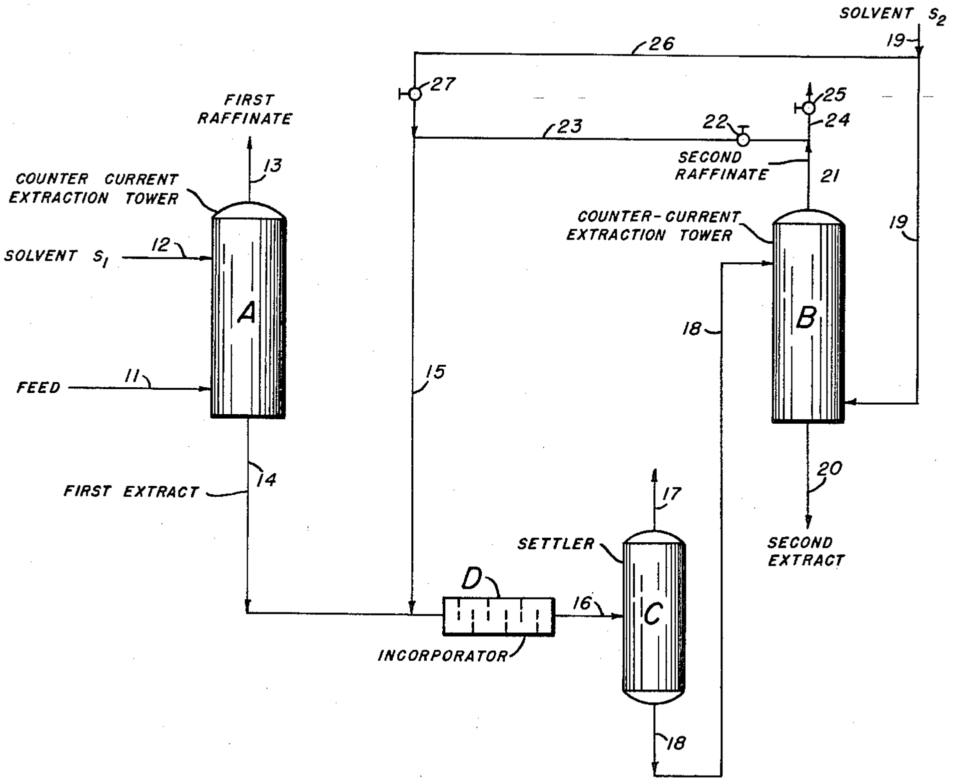
INVENTOR.
Reuben F. Pfennig,
BY
J B McKean
ATTORNEY.

United States Patent Office 3,051,650

Patented Aug. 28, 1962

1

3,051,650

SOLVENT EXTRACTION WITH LIQUID SULFUR DIOXIDE FOLLOWED BY HYDROCARBON WASH

Reuben F. Pfennig, Baytown, Tex., assignor, by mesne assignments, to Esso Research and Engineering Company, Elizabeth, N.J., a corporation of Delaware Filed July 6, 1954, Ser. No. 441,444

3 Claims. (Cl. 208—338)

The present application is directed to a dual solvent liquid phase extraction process for separating two compounds from a feed stream.

More specifically the present invention is directed to a dual solvent liquid phase extraction process for separating two compound types from a feed stream including two separate countercurrent extraction zones in which a raffinate fraction and an extract fraction are separated in each zone and in which the extract from the first zone is mixed with a portion of the solvent employed in the second zone or with at least a portion of the raffinate from the second zone and settled and the phase consisting predominantly of the solvent employed in the first zone is then passed as feed to the second zone.

Other objects and advantages of the present invention will be seen from the following description taken in conjunction with the drawing which is in the form of a diagrammatic flow sheet.

In describing the drawing and as indicated by legends thereon the feed stock contains two components designated X and Y and two solvents are used designated $S_1$ and $S_2$. These designations are used to show that the procedure is of general applicability. As a specific example it may be mentioned that the feed stock may be a light naphtha containing aromatic hydrocarbons as the X component and paraffin hydrocarbons as the Y component. The solvent $S_1$ may be liquid sulfur dioxide and the solvent $S_2$ may be a heavy paraffinic fraction such as a kerosene.

Turning now specifically to the drawing, the principal parts thereof consist of a first countercurrent extraction tower A, a second countercurrent extraction tower B, a settler C and incorporator D.

A feed stock mixture consisting of components X and Y is passed through inlet line 11 into the lower portion of tower A and is contacted countercurrently with liquid solvent $S_1$ fed into the tower through inlet line 12. A raffinate phase consisting principally of component Y is removed through outlet line 13. From the bottom of tower A through line 14 is removed an extract phase consisting of solvent $S_1$ component X and some component Y, the extract containing an enhanced proportion of X relative to Y. The extract in line 14 has added thereto through line 15 a portion of solvent $S_2$ which may be fresh solvent or may be contained in raffinate from tower B, the two components passing through incorporator D for thorough admixture and being removed through line 16 and passing to settler C where phase separation takes place under the influence of gravity. One of the phases consisting principally of solvent $S_2$, which was introduced through line 15 and Y, is removed through outlet line 17 and the other phase consisting primarily of solvent $S_1$ and X is removed through line 18 and passed to second extraction zone B where it flows downwardly countercurrent to solvent $S_2$ introduced into the bottom of the tower through inlet line 19. From the bottom of second tower B the extract phase consisting principally of solvent $S_1$ and component X is removed through outlet line 20. This extract is usually the desired component and may be subjected to additional treatment for recovery of the solvent $S_1$ for reuse in the process and for the recovery or further purification of component X as desired. From

2 the top of tower B a raffinate phase is removed by outlet line 21 and may be passed through open valve 22 and line 23 to line 15 where it is admixed with the extract phase of tower A as previously described. Any excess raffinate phase from tower B may be removed through line 24, controlled by valve 25. In case there is an insufficient amount of solvent $S_2$ in the second raffinate phase removed from tower B for admixture with the extract in line 14, additional solvent $S_2$ may be introduced by way of inlet line 19, branch line 26, and open valve 27. It may also be at times desirable to add only fresh solvent $S_2$ through line 15, in which case valve 22 is closed, all the raffinate from line 21 is removed through line 24, and the solvent is supplied to line 15 from line 19 through line 26 and open valve 27.

It will be understood that in general dual solvent liquid phase extraction for the separating of compounds X and Y is well known to the art. The two solvents being used in such an extraction process being generally designated as (1) more polar and (2) non-polar or less polar. For a description of such a process see, for example, Van Dijck et al. 2,245,945. The present invention differs from the prior art in the admixture of the extract phase from the first tower in a single mixing and settling stage with solvent $S_2$, preferably contained in raffinate from the second tower, settling to separate phases, the removal of the phase containing the major portion of the solvent $S_2$ added to the extract from the first tower and the passing of the remaining phase to the second extracting tower as feed to said second tower.

It is a particular advantage of the present invention that the use of the settler prior to the second extraction zone allows the incoming stream to equilibrate with solvent $S_2$, added as such or in raffinate from the second tower and thus allows the volumetric efficiency of the second extraction tower to be increased a substantial amount, for example, 20% when extracting a naphtha mixture consisting of aromatics and paraffins with $SO_2$ and a heavy paraffin as wash oil. The large volume of paraffins, if not removed in the settling zone, effectively reduces the mass velocity existing in the critical stages of the wash tower.

While it is not shown in the description and drawing, it is understood that each extract and raffinate phase ultimately recovered in the process may be treated, as by fractional distillation, to remove and recover the components X and Y and solvents $S_1$ and $S_2$, and the solvents may be returned for further use in the process.

Technically, in a liquid-liquid extraction process, the "extract" is the solvent rich phase, and the "raffinate" is the solvent lean phase. In a dual solvent process such as that of the present invention, where a component X is extracted by means of first solvent $S_1$ in a first zone, and the solution of X in $S_1$ is finally recovered from the second zone, industrial practice is to refer to the solution of X in $S_1$ as "extract" throughout the process. Thus, the phase rich in $S_2$, recovered from the second zone, which is technically an extract of Y in $S_2$, is referred to herein as the second raffinate.

The particular advantages of the present invention result from the fact that the feed stock being passed to the second tower is equilibrated with the raffinate before being charged to the second tower and this effectively reduces the mass velocity existing in the upper portion of the wash tower which is a limiting factor therein.

Specifically, consider the extraction of a light naphtha consisting of aromatics and non-aromatics with liquid sulfur dioxide and a heavy paraffinic wash oil: In a conventional operation with two extraction zones and the extract from the first zone charged directly to the second extraction tower for countercurrently contacting, the limitation of production is reached when the incoming sulfur dioxide extract settles incompletely from the outflowing wash oil. This limitation exists because at this point the two rates attain a maximum. Further down the column the paraffinic wash oil and sulfur dioxide exist at essentially equilibrium conditions and the differences in rates from stage to stage are small. At the top of the column, however, a tremendous increase in wash oil phase rate occurs because the incoming stream equilibrates with wash oil absorbing relatively large amounts of wash oil and displaces a relatively large amount of light paraffin therefrom. Subsequent contacting removes paraffins only as dictated by distribution coefficients and the subsequent extraction process follows a more or less differential extraction process. In accordance with the present invention where the extract from the first extraction tower is admixed with effluent wash oil from the wash tower or with fresh wash oil in an intermediate stage, intimately contacted and settled and the settled oil is removed from the system as spent wash oil while the settled $SO_2$ layer is introduced into the wash tower, the volumetric efficiency of the wash tower may be increased in an amount approximately 20% in aromatic production capacity. The large volume of light paraffins removed from the settling zone in the present conditioning stage to the second extraction tower effectively reduces the mass velocity existing in the critical stages of the wash tower.

By way of specific examples of mixtures of compounds which may be separated by specific solvents in accordance with the present invention, the following are listed in the table hereafter:

*Table*

| Example | Feed | | Solvents | |
|---|---|---|---|---|
| | X | Y | $S_1$ | $S_2$ |
| 1 | Para-nitrobenzoic acid. | Ortho-nitrobenzoic acid. | Chloroform | Water. |
| 2 | Para-chloronitrobenzene. | Ortho-nitrobenzene. | Heptane mixture. | Aqueous methanol (15% water). |
| 3 | Para-ethoxy aniline. | Ortho-ethoxy aniline. | 50% aqueous ethanol. | Hydrocarbon (50% gasoline, 50% benzene). |
| 4 | High V.I. lube oil. | Low V.I. lube oil. | Propane | Cresylic acid. |
| 5 | Toluene | Normal Heptane. | $SO_2$ | Kerosene. |
| 6 | Ortho-dihydroxy benzene. | Para-dihydroxy benzene. | Di-ethyl ether. | Gasoline. |
| 7 | Olefins | Aromatics | Furfurol | Kerosene. |
| 8 | Olefins | Paraffins | $SO_2$ | Kerosene. |

While specific descriptions and examples have been given to illustrate the practice of the present invention, it is to be understood that these are given for purpose of illustration and not by way of limitation.

The invention claimed is:

1. A solvent liquid phase extraction process of improved volumetric efficiency for separating aromatic components from a hydrocarbon feed stock containing such aromatic components in admixture with non-aromatic components, said process including the steps of charging a stream of said feed stock to a first liquid-liquid contact zone and there countercurrently contacting the same with liquefied sulfur dioxide, removing a first raffinate stream comprising non-aromatic components from said first zone, removing a first impure extract stream comprising a solution of said aromatic components and a portion of said non-aromatic components in liquefied sulfur dioxide from said first zone, initially admixing said first impure extract stream with a wash oil comprising non-aromatic hydrocarbons heavier than the non-aromatic components present in said feed stock in an amount sufficient to form two liquid phases, passing the resultant mixture to a settling zone and there allowing said mixture to settle under the influence of gravity to form a first phase derived primarily from said first extract and comprising a solution of said aromatic components and a reduced amount of said non-aromatic components of said feed stock in said liquefied sulfur dioxide and a second phase comprising said wash oil and displaced non-aromatic components from said feed stock, passing said first phase to a second liquid-liquid contact zone and countercurrently contacting the same therein with a wash oil comprising non-aromatic hydrocarbons heavier than the non-aromatic components present in said feed stock to form a second purified extract phase substantially free from non-aromatic components of said feed stock and a second raffinate phase comprising said wash oil and displaced non-aromatic components, and removing said second raffinate phase and said extract phase from said second zone, whereby the volumetric efficiency of said second contact zone is substantially improved.

2. A process as in claim 1 wherein the feed stock is a mixture of aromatic and non-aromatic hydrocarbons boiling in the naphtha boiling range and wherein the wash oil is a kerosene fraction.

3. A process as in claim 2 wherein the second raffinate from the second stage is the wash oil stream initially admixed with the said first extract stream.

References Cited in the file of this patent

UNITED STATES PATENTS

| | | |
|---|---|---|
| 2,114,524 | Egli | Apr. 19, 1938 |
| 2,342,205 | Manley | Feb. 22, 1944 |
| 2,656,301 | Findlay | Oct. 20, 1953 |
| 2,689,819 | Shelton et al. | Sept. 21, 1954 |
| 2,724,682 | Shelton et al. | Nov. 22, 1955 |
| 2,779,709 | Dale et al. | Jan. 29, 1957 |